Dec. 11, 1928.
D. HELLER
FLEXIBLE SEAM FASTENER
Filed May 11, 1927
1,694,915
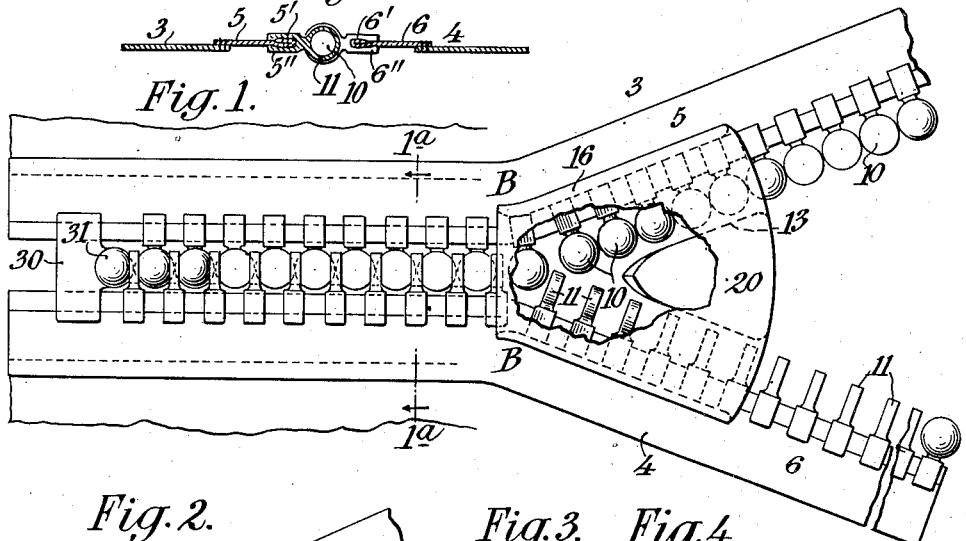
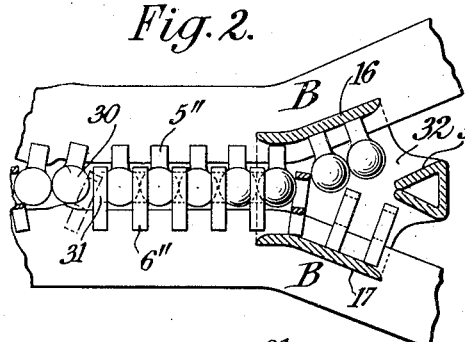
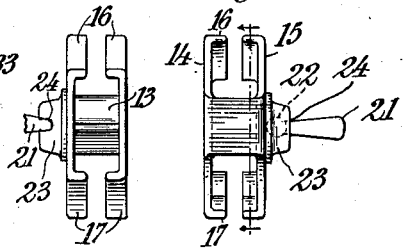
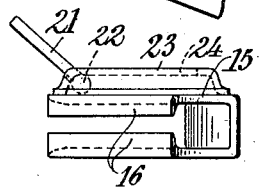
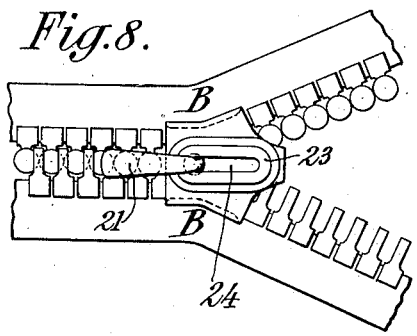
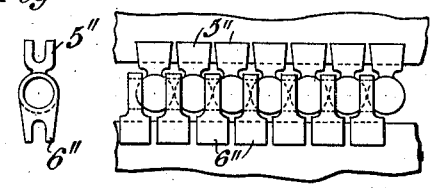
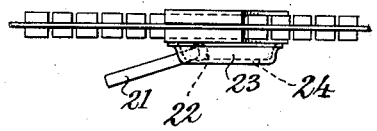
INVENTOR:
David Heller,
By Attorneys, Patented Dec. 11, 1928.

1,694,915

UNITED STATES PATENT OFFICE.

DAVID HELLER, OF NEW YORK, N. Y.

FLEXIBLE SEAM FASTENER.

Application filed May 11, 1927. Serial No. 190,438.

This invention relates to a continuous seam fastener of the type employing a plurality of elements on each side of the seam, the elements on either side being adapted to be interlocked with the elements opposite thereto under the action of a slidable guide which so directs the motion of the respective elements that they may be caused to freely engage and thereafter to remain engaged until unlocked by the reverse movement of the slide.

The object of this invention is to provide an improved fastener of the described type which has a more durable construction, one which may be fastened and unfastened with the greatest freedom and which is less subject to jamming or binding than other known constructions, whether such jamming is due to the pressure of foreign substances between the individual elements or because of the displacement of certain of the elements through abuse.

The invention further aims to provide a fastening device, the individual elements of which may be readily and accurately replaced so that in case of damage, the fastener can be satisfactorily repaired.

The invention further contemplates a fastener having unusual flexibility, so that it can be washed and put through a ringer without damage.

Further objects of the invention will be apparent from the following description, in which reference is had to the accompanying drawings, wherein, Figure 1 is a plan view of one form of the invention, a portion of the actuating slide being broken away to show the fastener elements as they appear when passing therethrough.

Fig. 1ª is a cross-section taken along the line a—a of Fig. 1.

Fig. 2 is a plan view of a slightly modified construction in this view, the top of the slide being removed.

Figs. 3 and 4 are end views of the slide shown in Fig. 2 as viewed from the left and right hand ends thereof, respectively.

Fig. 5 is a side elevation of the same slide.

Fig. 6 is a plan view of a portion of a seam having fastener elements, of a further slightly modified form.

Fig. 7 is an end view of the fastening elements shown in Fig. 6.

Figs. 8 and 9 are respectively a plan and side elevation of a further slightly modified form of the invention.

It will be understood that the fastening device according to the present invention may be applied directly to the edges of any type of fabric or flexible sheet material or it may be made up in the form of fastening strips, which strips may be subsequently applied to the seam edges. Such fastening strips are illustrated in Fig. 1, and as indicated, are sewn to the edges 3, 4 of the material which are to be held together by the fastener. For the sake of flexibility, the strips 5, 6 are preferably made of fabric and should be of a tough and durable nature, such as duck or light canvas.

It will be seen in Fig. 2 that the bases of the right and left hand fastener elements are fastened to the edges of strips 5, 6, simply by their clamping action thereupon. The edges 5', 6' of the strips are preferably folded over to form a bead of double thickness and the bases of the fastener elements are slotted to receive such beaded edges. When sufficient pressure is applied to the slotted portions of the elements a very secure connection is thus provided.

One row of elements comprises a plurality of ball or male fasteners 10, the ball portions of which are in substantial alignment and disposed with respect to one another in such manner that when the strip upon which they are mounted lies in a straight line, the balls either touch or are so close together that it is impossible to displace any ball longitudinally of the seam a distance sufficient to permit the escape of one of the opposite locking elements 11 from between said ball and an adjacent ball when the seam is closed. In hitherto known seam fasteners neither row of locking elements is designed to afford any effective mutual support between the free ends of adjacent elements in the same row and even when the two rows of elements are interlocked, the fastening of the seam is absolutely dependent upon the presence of every one of the elements in both rows, because if one element were missing there would be nothing to prevent adjacent elements from swinging longitudinally of the seam a sufficient distance to permit the disengagement of opposite elements interlocked therewith. That is to say, if a fastener element in either row were missing, any transverse stress on the seam would result in the unlocking of the entire seam, the locking of each element being dependent upon every other element in the two rows. This is not true of the seam fastener according to the present invention. Actually a considerable number of the elements 11 may be bodily removed without interfering with the positive locking of the remaining elements because the ball elements 10 afford mutual support and are thus held in effective alignment regardless of the absence of one or more of the elements 11 which interlock therewith when the seam is closed. If the ball or male fastener elements, as they may be generically termed, are disposed as shown in the embodiment illustrated herewith, no play whatever is permitted between them since they are in actual contact one with another except when forcibly separated to permit the engagement of the female elements 11 between them. Such tangent arrangement of the male fasteners is not essential as the advantages of the present invention are realized by any disposition of the fastener elements in a given row which will insure the contact toward the free ends of adjacent elements in the said row before an element is moved longitudinally of the seam a distance sufficient to permit the escape of a co-operating element of the opposite row. This arrangement of the fastener elements also insures that they cannot be displaced either bodily or angularly in the plane of the seam far enough to upset the accuracy of alignment requisite to insure a smooth and non-jamming locking operation.

The row of female fastening elements comprises a plurality of members having ring-like locking portions 11, the width of the ring being considerably smaller than its diameter. The internal diameter of these rings is just sufficient to engage the rounded surface of the male elements 10 when said elements occupy their normal straight line locking position, as shown to the left in Fig. 1. When the rings are in locking relationship with the balls, a very secure fastening of the seam is effected because of the fact that the tangent balls cannot be displaced a sufficient distance to permit the rings to pass between them without deforming or disrupting the material upon which the fasteners are mounted. Nevertheless the seam, while being thus securely locked, is extremely flexible because of the fact that each ball and ring combination constitutes virtually a ball and socket joint. The two edges of the seam may be more freely folded about the axis of the rings than if the fabric itself formed the seam.

While the balls form a perfect lock when in the straight line position shown to the left in Fig. 1, they may be readily separated to permit the engagement or disengagement of the rings therebetween by bending the strip 5 upon which the balls are mounted, and the engagement or disengagement of the rings can be further facilitated by bending the strip 6 upon which the latter are mounted. Such bending of the strips occurs in the zone marked B, and this bending is automatically performed by means of the actuating slide 10, which will hereinafter be described. The separation of the balls and passage of the rings therebetween is clearly illustrated in the broken away portion of the actuating slide, as shown in Fig. 1.

The actuating slide will now be described, reference being had also to Figs. 2 to 5 inclusive, which illustrate a slide of similar construction. This actuating slide comprises top and bottom guide plates 14, 15. These plates are fastened together by a central member 13 which is of sufficient thickness to maintain a separation of the plates just sufficient to permit the free movement of the balls and rings therebetween. The edges of guide plates 14, 15 are not parallel but converge, and are flanged to provide guide shoulders 16, 17. The shoulders 16 engage the ball fastener elements, and the guides 17 the ring fastener elements, and prevent them from being withdrawn from between the guide plates by a movement transverse to the flanges. The said flanges are separated sufficiently to permit the free passage of the strips 5, 6, to which the said elements are attached, therebetween.

The fastener elements are prevented from being inwardly displaced from the guide flanges 16, 17, by the vertical walls of the central member 13, these walls forming a wedge-shaped guide. By this construction the actuating slide, which is generally designated by the numeral 20, may be moved freely along the strips carrying the fastener elements while the elements are effectively restrained against displacement transversely thereto.

The contour and disposition of the guide flanges 16, 17, is such that these flanges, in co-operation with the wedge-shaped central member 13, cause the strips 5, 6, to be bent outwardly or away from the center line of the seam in the zone marked B. The bending or flexing of these strips causes the balls, which are tangent one to another when the strip is straight, to spread apart, and the same action causes a spreading apart of the ring elements.

The slide 20 is preferably provided with an operating finger piece or grip 21, the inner end of which comprises a ball 22. This ball travels within a guideway 23, the slot 24 of which is too small to permit the passage of the ball therethrough. This guideway is fastened on the face of slide 20 and parallel to the axis of the seam. The longitudinal movement permitted by this arrangement should be sufficient to insure that the grip 21 will exert its effort upon the slide 20 at a point in advance of the center of resistance to the motion of such slide for movements in either direction. When the effort applied to the slide is ahead of the center of resistance, the slide automatically tends to trail out in alignment with the seam, whereas if the effort is applied to the rear of such point of resistance, the slide will tend to swing out of alignment with the seam, and bind or jam.

At either end of the row of fastening elements, a stop must be provided to prevent the slide 20 from running completely off the fasteners. Such stops are preferably formed, as shown, the stop at the left hand end of the seam comprising a solid bridge member 30 which is clamped to the side strips 5, 6, in the same manner as the fastener elements themselves. This bridge piece carries a ball 31 similar to the balls of the fastener elements, and this ball engages the first ring fastener to hold its against displacement. The stop at the right hand end of the seam is provided by simply attaching one of the ball fastener elements 10 at the end of the row of ring fasteners. When the slide 20 is moved to the right hand end of the seam, two balls are fed into the opening at the narrow end of the slide, instead of a ball and ring, and this effects a jamming action which will not permit further movement of the slide to the right.

The operation of the fastener according to the present invention, is as follows:

Normally, when the seam is open, the slide 20 occupies a position at the extreme left of the seam. When it is desired to lock the seam, the tongue 21 is gripped between the fingers and moved towards the right. The tongue slides to the right hand end of the guideway 23, and in its further movement draws the slide along the seam. The action of the guide flanges 16, 17, and the wedge-shaped central member 13, causes the material upon which the fasteners are mounted to be flexed or bent in the zone B so as to permit the interlocking of the balls and rings. As such balls and rings pass through the narrow end of the slide, the material again assumes its normal straight line, thereby permitting the balls to come together so that they touch or are so close together that because of their mutual support they can not be displaced sufficiently to permit them to get out of effective alignment, i. e., separated far enough to permit the escape of a ring from between them. The locked seam to the left of the slide can not thereafter be pulled apart without damage to the material upon which the fasteners are mounted. To open the seam, the slide is moved in the opposite direction on the reverse movement the tongue 21 first sliding to the left hand end of its guideway to insure a proper self-aligning action of the slide.

Unlike other known seam-fastening devices, the ball fasteners 10, even when the seam is open, are maintained in accurate alignment by virtue of their tangential disposition. For one of such ball fasteners to shift longitudinally out of alignment it is necessary to shift the entire row, and no force to which such fastener is ordinarily subjected is capable of doing this. In the present construction the ring fasteners 11 on the other edge of the seam are not self-aligning in this manner, but this is of no consequence as the balls always present at the time they are caused to engage the rings, a smooth guiding surface which will insure the entry of a ring between each pair of balls regardless of whether the rings are in perfect alignment or not. In other words, one of the rows of fasteners is always in perfect alignment, and this row of fasteners is capable of automatically straightening out any misalignment in the other row of fasteners.

The somewhat modified construction illustrated in Figs. 2 to 5 inclusive corresponds in principle to the construction hereinbefore described. The ball and ring fastener elements 30, 31 correspond to elements 10, 11 of Fig. 1, and differ only in the proportionate width of ring elements with respect to the balls. The slotted grip portions 5″, 6″, of the fastener elements are also somewhat narrower with respect to the dimensions of the balls and rings, the smaller these gripping portions are made the greater will be the flexibility of the seam, and therefore it is desirable generally to make such portions as small as is consistent with the required strength.

Where ring fasteners having very small edge-gripping portions 6′ are used, it is found that because of the relatively flexible engagement of such element with the edge of the material on which it is mounted, a ring which has been damaged by abuse may be swung in the plane of the fastener out of alignment with the balls so that the plane of the ring is no longer transverse to the seam. A damaged ring which has been thus shifted out of alignment is indicated in dotted lines at the left in Fig. 2. This damaged ring does not in any way interfere with the operation of the fastener as a whole, the balls and remaining rings sliding freely through the actuating slide and effecting a locking engagement which is almost as positive as if every element of the fastener were intact.

Unlike other known fasteners, the effectiveness of the seam lock in the fastener according to the present invention, is not dependent upon the presence and perfect functioning of every one of the locking elements or upon the capacity of the edge-gripping portions 5″, 6″ of the fasteners to maintain the locking elements in accurate alignment. As hereinbefore described, the positive positioning of the ball locking elements is insured by their tangent or closely spaced arrangement, and since the balls can not shift longitudinally of the seam, the rings can not possibly escape from between them.

While the loss of one or more of the ball fastener elements would, to a certain extent, render the seam lock less positive, nevertheless the tangent arrangement of the remaining balls would lend to each the support of the others, so that except in the balls immediately adjoining the vacant spaces in the row, the remaining balls will be held effectively in alignment and insure a positive locking engagement with the rings disposed therebetween. The guide 32 operates in precisely the same manner as does guide 20, the construction differing only in that instead of a solid connecting or distance piece 13, a hollow wedge-shaped member 33 is formed by bending up a portion of the sheet material out of which the face plate is made.

The fastening means illustrated in Figs. 6 to 9 inclusive are shown merely to indicate certain modifications in the shape of the fastener elements and the guide. In Fig. 7 a ball and ring fastener are shown, the slotted edge-gripping portions 5″, 6″ being shown as they appear before being forced together to grip the edge of the material which lies within the slots.

While in the various forms of my invention hereinbefore described and illustrated I have referred to balls and rings as the preferred form of co-operating fastener elements, it will be apparent that the objects and advantages of the present invention may be realized in constructions employing mechanically equivalent elements. It is obviously not essential that the tangent or closely spaced members 10 be spheres or that the ring members be round rings or that they form a perfectly continuous closure. The only requirement as to form and the disposition of the locking elements is that the elements in one row have mutual contact surfaces or tangent points, and it is not essential that this contact be continuously maintained. It is sufficient if the said elements are placed near enough together so that at their free ends, i. e., the ends which project from the edge of the seam, they may not be displaced longitudinally of the seam sufficiently to throw them out of effective alignment; and by effective alignment is meant such alignment as will prevent the escape of an element of the opposite row from between said first-mentioned elements.

The particular nature of the female locking elements according to the preferred embodiment of the present invention is that they have a through opening, and the diameter of this opening should be considerably in excess of the width of the ring proper. This construction of the rings permits of their being very readily freed of foreign matter such as mud or the like, which would otherwise accumulate within the ring and prevent the free engagement of the fastener elements. In devices of this nature hitherto known, the presence of foreign matter between the fastener elements has in certain instances caused a jamming action which rendered them practically inoperative. The fastener according to the present invention actually frees itself of any foreign matter, because when a ball enters one of the shallow rings any such matter is pushed out through the ring opening and drops out of the slide 20 without interfering with the free action of the device in any way.

While several modifications of the present invention have been described and illustrated, it will be understood that the invention is not limited thereto but may be otherwise variously modified and embodied without departing from the spirit thereof, as set forth in the following claims.

What I claim is:

1. A seam-fastening device comprising a series of fastener elements attached to one edge of the seam, a series of fastener elements attached to the other edge of the seam and adapted to interlock with said first-mentioned series, the free ends of the fastener elements in one of said series being disposed so close together that one element in the series will engage an adjacent element in the said series before it has swung longitudinally of the seam and thus separated itself from the other adjacent element in the said series a sufficient distance to permit the escape or withdrawal of an element of the opposite series from between said two last-mentioned elements, and an actuating slide adapted when moved in one direction to interlock said opposite series of fastener elements, and upon the reverse movement to separate them.

2. A seam fastening device comprising a series of male fastener elements attached to one edge of the seam, a series of female fastener elements attached to the other edge of the seam and adapted to interlock with said first-mentioned series, the male fastener elements toward their free ends being disposed so close together that one of said male elements will engage an adjacent male element before the free end of the first-mentioned male element can be swung longitudinally of the seam a sufficient distance to permit the escape or withdrawal of a female fastener element engaged between said first-mentioned male element and another male element adjacent thereto.

3. A seam fastening device comprising a series of male fasteners attached to one edge of the seam, the locking portions of said fasteners being disposed so as to have mutual points of contact when the seam edge lies in a straight line, and a series of female fasteners attached to the opposite edge of said seam, the locking portions thereof being adapted to surround the said contacting portions of the male fasteners.

4. A seam fastening device comprising a series of balls attached to one edge of the seam and a series of rings fastened to the other edge of the seam, the said rings alternating with said balls when the seam is locked, the width of the rings at the point farthest from the seam edge to which such rings are attached being less than the radius of the balls.

5. A seam fastening device comprising a series of balls attached to one edge of the seam, the centers of adjacent balls in said series being separated by substantially the diameter of the balls whereby the said series will present the appearance of a continuous string of beads, and a series of female fastener elements on the other edge of said seam adapted to co-operate with said balls to lock the seam.

6. A seam fastening device comprising a series of male fastener elements attached to one edge of the seam, a series of female fastener elements co-operating therewith and attached to the other edge of the seam, said male elements being disposed so as to provide toward their free ends direct mutual support one for another when the seam edge lies in a straight line and regardless of the presence of a female element between them, whereby the effective longitudinal alignment of the said male elements is preserved.

7. The seam fastening device according to claim 6, further characterized in that an actuating slide is provided to interlock said elements, and the said mutually supporting male elements being so formed as to provide smooth guiding surfaces which lead the female elements into locking position therebetween even though said female elements are initially out of proper alignment.

8. A seam fastening device comprising a series of male fastener elements attached to one edge of the seam, a series of female fastener elements attached to the other edge of said seam, an actuating slide to interlock and unlock said elements, and a stop for said slide at the end of the seam last closed by said slide, said stop comprising one of said male elements attached at the end of, and on the same edge with, the said series of female elements.

9. A seam fastening device comprising a series of ball fasteners, a series of ring fasteners, an actuating slide for interlocking and unlocking said fasteners, and a stop for said slide at the end of the seam first closed by said slide, said stop comprising a bridge member holding the two edges of the seam together, and a ball mounted on said member and in alignment with the fastener balls, said ball being adapted to engage the first ring of the said series.

10. A seam fastening device comprising two series of co-operating fastener elements attached to the opposite edges of the seam, an actuating slide therefor, said slide having a finger grip by which it is moved along the seam, and a ball and socket connection between said grip and slide whereby the said grip may be turned completely around on its own axis.

11. The seam-fastening device according to claim 10, further characterized in that the socket of said ball and socket connection comprises an elongated longitudinal slot formed in said slide, said slot being disposed to permit the said grip to shift longitudinally of the seam.

In witness whereof, I have hereunto signed my name.

DAVID HELLER.